(12) United States Patent
Kataoka et al.

(10) Patent No.: US 11,386,267 B2
(45) Date of Patent: Jul. 12, 2022

(54) ANALYSIS METHOD, ANALYZER, AND COMPUTER-READABLE RECORDING MEDIUM

(71) Applicant: FUJITSU LIMITED, Kawasaki (JP)

(72) Inventors: Masahiro Kataoka, Kamakura (JP); Masao Ideuchi, Hachioji (JP); Satoshi Onoue, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 311 days.

(21) Appl. No.: 16/673,991

(22) Filed: Nov. 5, 2019

(65) Prior Publication Data
US 2020/0065367 A1 Feb. 27, 2020

Related U.S. Application Data

(63) Continuation of application No. PCT/JP2018/010810, filed on Mar. 19, 2018.

(30) Foreign Application Priority Data

May 16, 2017 (JP) .............................. JP2017-097670

(51) Int. Cl.
*G06F 16/81* (2019.01)
*G06F 40/242* (2020.01)
*G06F 16/31* (2019.01)
*G06F 40/237* (2020.01)

(52) U.S. Cl.
CPC .......... *G06F 40/242* (2020.01); *G06F 16/313* (2019.01); *G06F 16/81* (2019.01); *G06F 40/237* (2020.01)

(58) Field of Classification Search
CPC .............................. G06F 16/81; G06F 16/313
See application file for complete search history.

(56) References Cited

U.S. PATENT DOCUMENTS

| | | | |
|---|---|---|---|
| 9,454,597 B2* | 9/2016 | Kusumura | G06F 16/81 |
| 2010/0281030 A1 | 11/2010 | Kusumura et al. | |
| 2017/0103123 A1* | 4/2017 | Kataoka | G06F 16/325 |

FOREIGN PATENT DOCUMENTS

| | | |
|---|---|---|
| JP | 10-222511 A | 8/1998 |
| JP | 2000-259629 A | 9/2000 |
| JP | 2010-146273 A | 7/2010 |
| JP | 2014-106707 A | 6/2014 |
| JP | 2015-194801 A | 11/2015 |
| WO | 2009/063925 A1 | 5/2009 |

OTHER PUBLICATIONS

International Search Report and Written Opinion dated Jun. 19, 2018 for PCT/JP2018/010810 filed on Mar. 19, 2018, 6 pages including English Translation of the International Search Report.

* cited by examiner

*Primary Examiner* — Baoquoc N To
(74) *Attorney, Agent, or Firm* — Xsensus LLP

(57) ABSTRACT

A non-transitory computer-readable recording medium stores therein an analysis program that causes a computer to execute a process including: generating an index based on a dictionary for use in morphological analysis, the index relating to morphemes registered in the dictionary, the index including flags by which a beginning and an end of each morpheme registered in the dictionary are determinable; and extracting a plurality of dividable words from input character data by using the index.

12 Claims, 13 Drawing Sheets

FIG.4

| CJK WORDS |
|---|
| アメリカ |
| アメリカ合衆国 |
| アメリカ独立戦争 |
| アメリカメキシコ戦争 |
| アメリカ先住民 |
| アメリカ先住民族 |
| アメリカ労働総同盟産業別組合会議 |
| ... |
| アメリカ松 |
| アメリカ杉 |
| アメリカザリガニ |
| ... |
| アメリカナイズ |
| アメリカニズム |
| ... |

| 0 | ... | 6 | 7 | 8 | 9 | 10 | 11 | 12 | 13 | 14 | 15 | 16 | 17 | 18 | 19 | 20 | 21 | 22 | 23 | 24 | 25 | 26 | 27 | ... |
|---|---|---|---|---|---|---|---|---|---|---|---|---|---|---|---|---|---|---|---|---|---|---|---|---|
| ... | ア | メ | リ | カ | < | U | S | > | ア | メ | リ | カ | 先 | 住 | 民 | < | U | S | > | ア | メ | リ | カ | 先 | 住 | 民 | 族 | < | U | S | > | ... |

ANALYSIS METHOD, ANALYZER, AND COMPUTER-READABLE RECORDING MEDIUM

CROSS-REFERENCE TO RELATED APPLICATIONS

This application is a continuation application of International Application No. PCT/JP2018/010810, filed on Mar. 19, 2018 which claims the benefit of priority of the prior Japanese Patent Application No. 2017-097670, filed on May 16, 2017, the entire contents of each are incorporated herein by reference.

FIELD

The embodiment discussed herein is related to, for example, an analysis method.

BACKGROUND

Unlike alphabetical writing in which word boundaries are indicated by delimiters such as blank spaces, characters of Chinese, Japanese, and Korean languages, or CJK characters, are processed after boundaries between morphemes are specified. As an example of related techniques of analyzing the boundaries between morphemes in target character data and outputting character strings of dividable words, morphological dictionaries of, for example, MeCab and ChaSen, and Trie and Double-Array are known.

Examples of techniques that use the results of morpheme segmentation analysis include Word2Vec by which words in the target character data are assigned corresponding vectors. Such related techniques are disclosed in, for example, Japanese Laid-open Patent Publication No. 2010-146273, Japanese Laid-open Patent Publication No. 10-222511, Japanese Laid-open Patent Publication No. 2014-106707, and International Publication Pamphlet No. WO2009/063925.

SUMMARY

According to an aspect of the embodiments, a non-transitory computer-readable recording medium stores therein an analysis program that causes a computer to execute a process including: generating an index based on a dictionary for use in morphological analysis, the index relating to morphemes registered in the dictionary, the index including flags by which a beginning and an end of each morpheme registered in the dictionary are determinable; and extracting a plurality of dividable words from input character data by using the index.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example data structure of dictionary data;

FIG. 5 is a diagram illustrating an example data structure of array data;

FIG. 6 is a diagram illustrating an example data structure of an index;

FIG. 8 is a diagram illustrating an example data structure of index data;

FIG. 10 is a first diagram for describing an example process of extracting CJK words;

FIG. 11 is a second diagram for describing the example process of extracting CJK words;

DESCRIPTION OF EMBODIMENT

The related techniques above, however, can fail to analyze the boundaries between morphemes at high speed with reduced file size.

In the field of analysis such as Word2Vec, which uses the results of the morphological analysis, the importance of accurate morpheme segmentation has been emphasized than ever before.

To meet this demand, the related techniques have increased the entries included in a morphological dictionary to extract a plurality of dividable word candidates. However, more entries in a morphological dictionary can lead to a rapid increase in size of Trie and Double-Array, thereby increasing the time for retrieval and determination processing.

For example, to morphologically segment a CJK character string "アメリカ先住民族", the segmentation is performed based on a determination not only that this character string includes a morpheme "アメリカ先住民" but also that the character string is not divided into "アメリカ先住民" and "族".

To assign target character data corresponding vectors by using Word2Vec, the results of the morphological analysis on the target character data have to be smallest meaningful units of character strings. When target character string data is segmented as preprocessing before Word2Vec, the related morphological analysis can fail to segment the data into smallest meaningful units of character strings and can thus fail to satisfy the conditions of Word2Vec.

For example, a proper noun "三菱東京UFJ銀行金沢文庫支店" and a new word "妖怪ウォッチ" minimum meaningful units of character strings by themselves, but the related morphological analysis fails to segment the character strings in this way. When, for example, target character data "···三菱東京UFJ銀 行金沢文庫支店···" is segmented into morphemes by using MeCab, the character string "三菱東京UFJ銀行 金沢文庫支店", which is a meaningful CJK character string by itself, is segmented into "三菱", "東京", "UFJ", "銀行", "金沢", "文庫", and "支店". When target character data "…妖怪ウォッチ…" is segmented into morphemes by using MeCab, the character string "妖怪ウォッチ", which is a meaningful CJK character string by itself, is segmented into "妖怪" and "ウォッチ".

Morphological analysis may be configured to output proper nouns as unknown words, but this configuration can segment the words based on the registered words or can eliminate useful information. The results of such morphological analysis may be insufficient for use in Word2Vec.

Preferred embodiments will be explained with reference to accompanying drawings. The embodiment described herein is not intended to limit the scope of the present disclosure.

Figure 1:
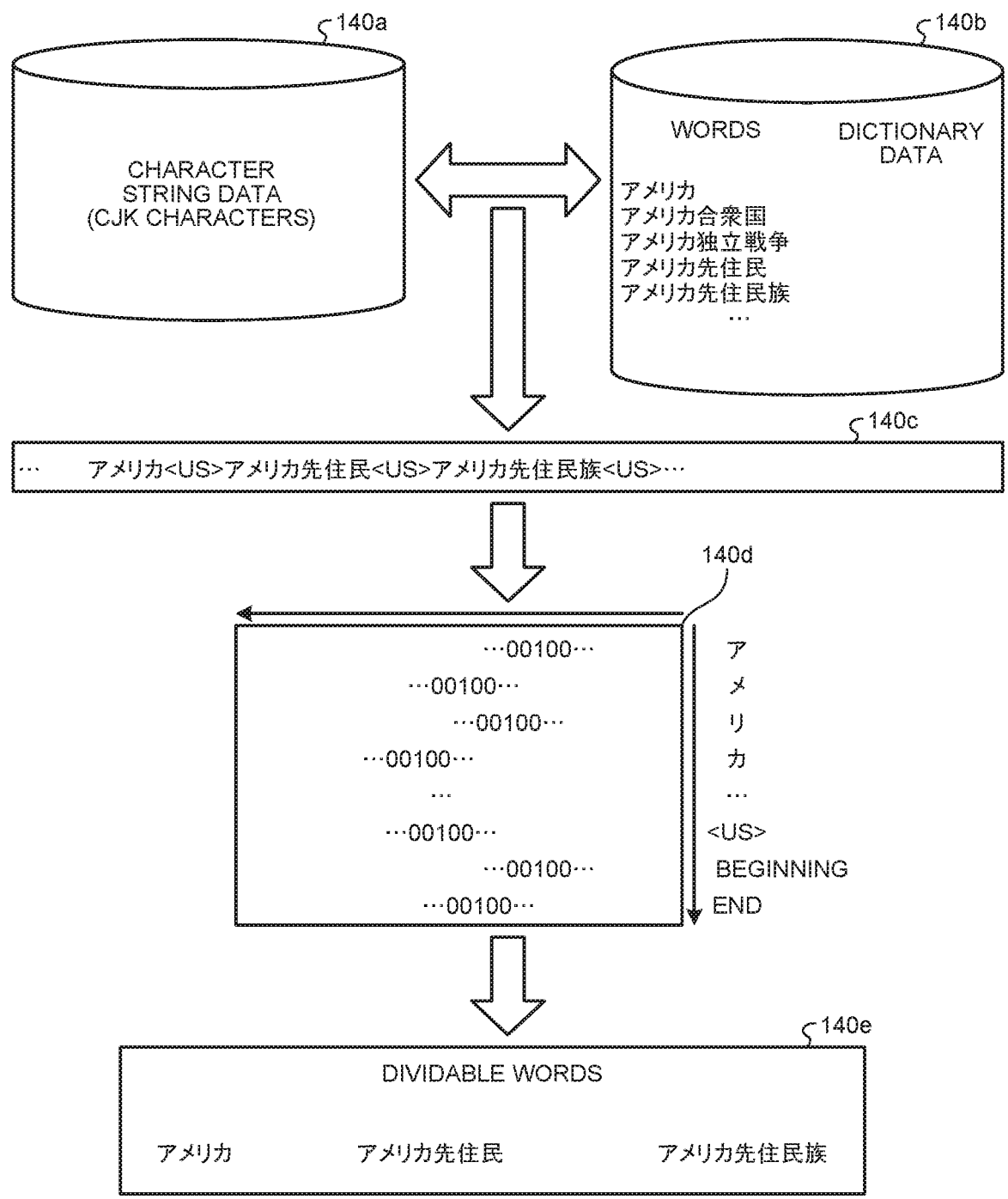
FIG. 1 is a diagram for describing example processing of an analyzer according to an embodiment.

FIG. 1 is a diagram for describing an example processing of an analyzer according to an embodiment of the present disclosure. When the analyzer extracts dividable word candidates from character string data 140a, the analyzer executes the following processing as illustrated in FIG. 1. The character string data 140a is, for example, data of a document including CJK characters. The CJK characters correspond to Chinese, Japanese, or Korean characters.

The analyzer compares the character string data 140a with dictionary data 140b. The dictionary data 140b includes definitions of words (morphemes) to be used as dividable word candidates.

The analyzer scans the character string data 140a from the beginning and extracts hit character strings found in the words defined in the dictionary data 140b, and then stores the extracted character strings in array data 140c.

The array data 140c includes words that are the character strings included in the character string data 140a and defined in the dictionary data 140b. To indicate a boundary between words, a unit separator, or <US>, is registered. The analyzer compares the character string data 140a with the dictionary data 140b. When, for example, character strings "アメリカ", "アメリカ先住民" and "アメリカ先住民族" registered in the dictionary data 140b are found in this order, the analyzer generates the array data 140c illustrated in FIG. 1.

After generating the array data 140c, the analyzer generates an index 140d corresponding to the array data 140c. The index 140d is information associating characters with respective offsets. An offset indicates a position of a character in the array data 140c. For example, when a character "ア" is at the $n_1$th position from the beginning of the array data 140c, a flag "1" is set at the position of an offset $n_1$ in a row (bitmap) corresponding to the character "ア" in the index 140d.

In the index 140d in the present embodiment, the positions of the "beginning" and the "end" of the words and the position of <US> are associated with respective offsets. For example, the beginning of a word "アメリカ" is "ア", and the end thereof is "カ". When the character "ア", which is the beginning of the word "アメリカ", is at the $n_2$th position from the beginning of the array data 140c, a flag "1" is set at the position of an offset $n_2$ in a row corresponding to the beginning in the index 140d. When the character "カ", which is the end of the word "アメリカ", is at the $n_3$th position from the beginning of the array data 140c, a flag "1" is set at the position of an offset $n_3$ in a row corresponding to the "end" in the index 140d.

When "<US>" is at the $n_4$th position from the beginning of the array data 140c, a flag "1" is set at the position of an offset $n_4$ in a row corresponding to "<US>" in the index 140d.

The analyzer can specify the positions of the characters in a word included in the character string data 140a and can determine whether the character is the beginning or the end, and can specify the boundaries (<US>) of the characters by referring to the index 140d. In this regard, character strings in the character string data 140a that can be defined by the beginning and the end in the index 140d are words that are dividable.

The analyzer determines the longest matching character string based on the index 140d with the character strings defined by the beginning and the end being segmentation units to extract the dividable words from the character string data 140a. An extraction result 140e illustrated in FIG. 1 includes extracted words "アメリカ", "アメリカ先住民", and "アメリカ先住民族".

As described above, the analyzer generates, based on the character string data 140a and the dictionary data 140b, the index 140d relating to words (morphemes) defined in the dictionary data 140b and sets flags by which the beginning and the end of each word can be determined. The analyzer then extracts a plurality of dividable words from the character string data 140a by using the index 140d. For example, the index 140d includes a chunk of dividable words defined in the dictionary data 140b. Each word can be specified by the beginning and the end flags. The analyzer determines the longest matching character string with the character strings defined by the beginning and the end flags being segmentation units to extract the dividable words. This configuration allows the analyzer to specify the dividable words and perform analysis using values assigned to the words.

Examples of analysis using the values assigned to the words include vector operation on the character string data 140a. The vector operation uses the words extracted by the analyzer as a unit of processing.

Figure 2:
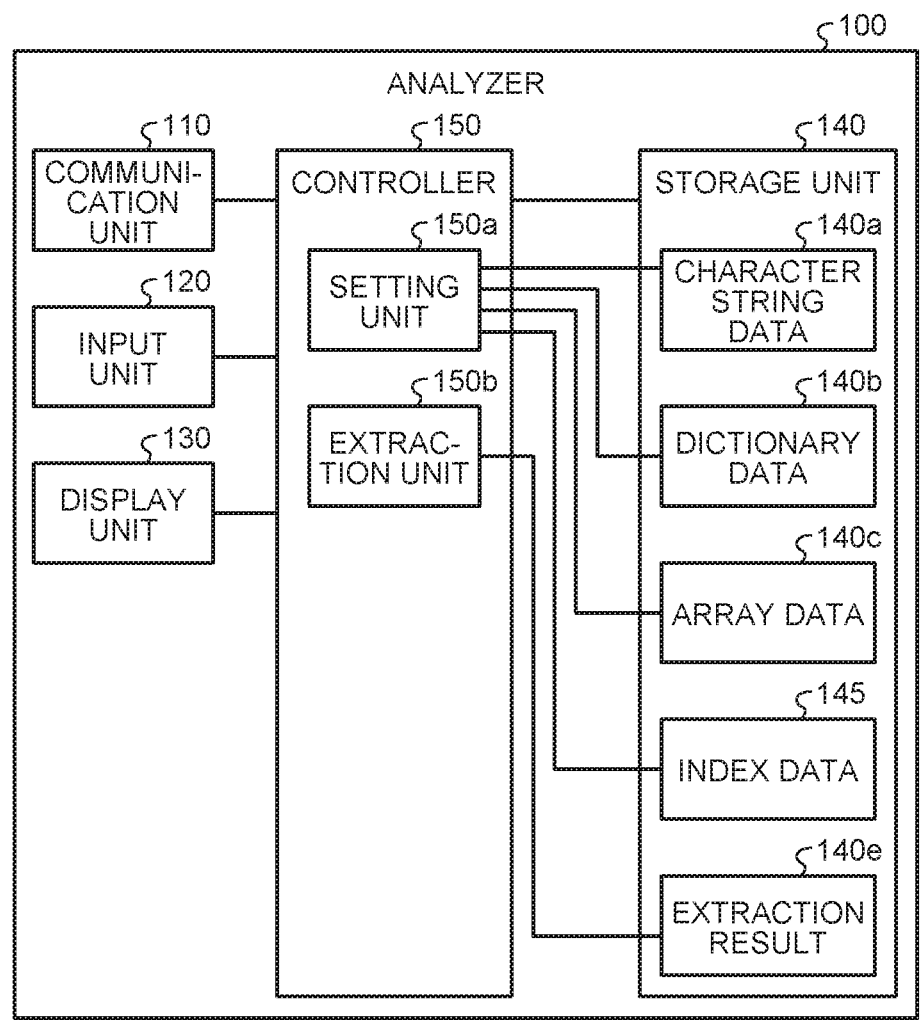
FIG. 2 is a functional block diagram illustrating a configuration of the analyzer according to the embodiment.

FIG. 2 is a functional block diagram illustrating a configuration of the analyzer according to the embodiment. As illustrated in FIG. 2, this analyzer 100 includes a communication unit 110, an input unit 120, a display unit 130, a storage unit 140, and a controller 150.

The communication unit 110 is a processor that communicates with other external devices via a network. The communication unit 110 corresponds to a communication device. For example, the analyzer 100 may receive, for example, the character string data 140a and the dictionary data 140b from an external device and store the received data in the storage unit 140.

The input unit 120 is an input device for use in inputting various types of information to the analyzer 100. The input unit 120 corresponds to, for example, a keyboard, a mouse, and a touch panel.

The display unit 130 is a display device that displays various types of information output from the controller 150. The display unit 130 corresponds to, for example, a liquid crystal display and a touch panel.

The storage unit 140 stores therein the character string data 140a, the dictionary data 140b, the array data 140c, index data 145, and the extraction result 140e. The storage unit 140 corresponds to a semiconductor memory device such as a flash memory or a storage device such as a hard disk drive (HDD).

Figure 3:
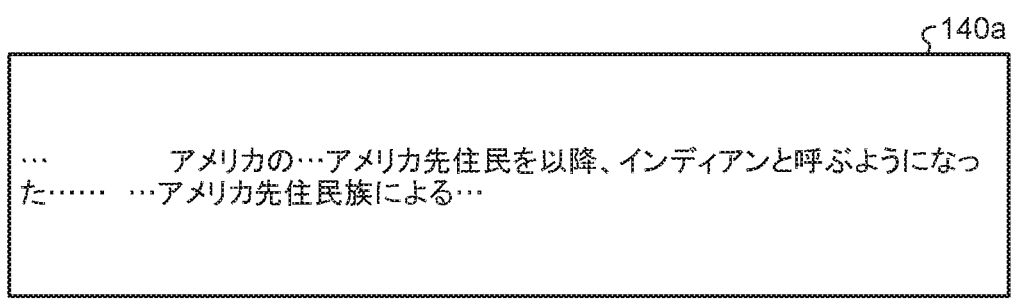
FIG. 3 is a diagram illustrating an example data structure of character string data.

The character string data 140a is document data to be processed. FIG. 3 is a diagram illustrating an example data structure of the character string data. As illustrated in FIG. 3, the character string data 140a is data written in, for example, CJK characters.

The dictionary data 140b is definition information on CJK words to be used as dividable word candidates. FIG. 4 is a diagram illustrating an example data structure of the dictionary data. The CJK words listed in FIG. 4 are presented for illustrative purposes only. The examples of the CJK words listed in FIG. 4 are nouns, but the dictionary data 140b includes adjectives, verbs, adverbs, and other parts of speech of the CJK words. With regard to verbs, the verb forms are defined.

The array data 140c includes CJK words that are the character strings included in the character string data 140a and defined in the dictionary data 140b. FIG. 5 is a diagram illustrating an example data structure of the array data. The example array data 140c in FIG. 5 includes CJK words that are segmented by <US>. The numbers above the array data 140c each indicate an offset from the beginning of the array data 140c to which an offset "0" is allocated.

The index data 145 corresponds to the index 140d that has been described with reference to FIG. 1. As will be described later, the index 140d is hashed and stored in the storage unit 140 as the index data 145.

The extraction result 140e is a result of dividable word candidates extracted from the character string data 140a by the processing of the controller 150, which will be described later.

The controller 150 includes a setting unit 150a and an extraction unit 150b. The controller 150 can be implemented by, for example, a central processing unit (CPU) or a micro processing unit (MPU). The controller 150 can be implemented by a hardwired logic such as an application specific integrated circuit (ASIC) or a field programmable gate array (FPGA).

The setting unit 150a generates the array data 140c based on the character string data 140a and the dictionary data 140b, and generates the index data 145 based on the array data 140c.

The following describes example processing of the setting unit 150a for generating the array data 140c based on the character string data 140a and the dictionary data 140b. The setting unit 150a compares the character string data 140a with the dictionary data 140b. The setting unit 150a scans the character string data 140a from the beginning and extracts hit character strings found in the CJK words registered in the dictionary data 140b, and then stores the extracted character strings in array data 140c. When the setting unit 150a stores a hit character string in the array data 140c and then stores the next hit character string in the array data 140c, the setting unit 150a sets <US> next to the preceding character string and then stores the next hit character string next to the set <US>. The setting unit 150a repeatedly executes the processing above and generates the array data 140c.

After generating the array data 140c, the setting unit 150a generates the index 140d. The setting unit 150a scans the array data 140c from the beginning and associates CJK characters with offsets, the beginning of the CJK character strings with offsets, the end of the CJK character strings with offsets, and <US> with offsets, and generates the index 140d.

Figure 6:
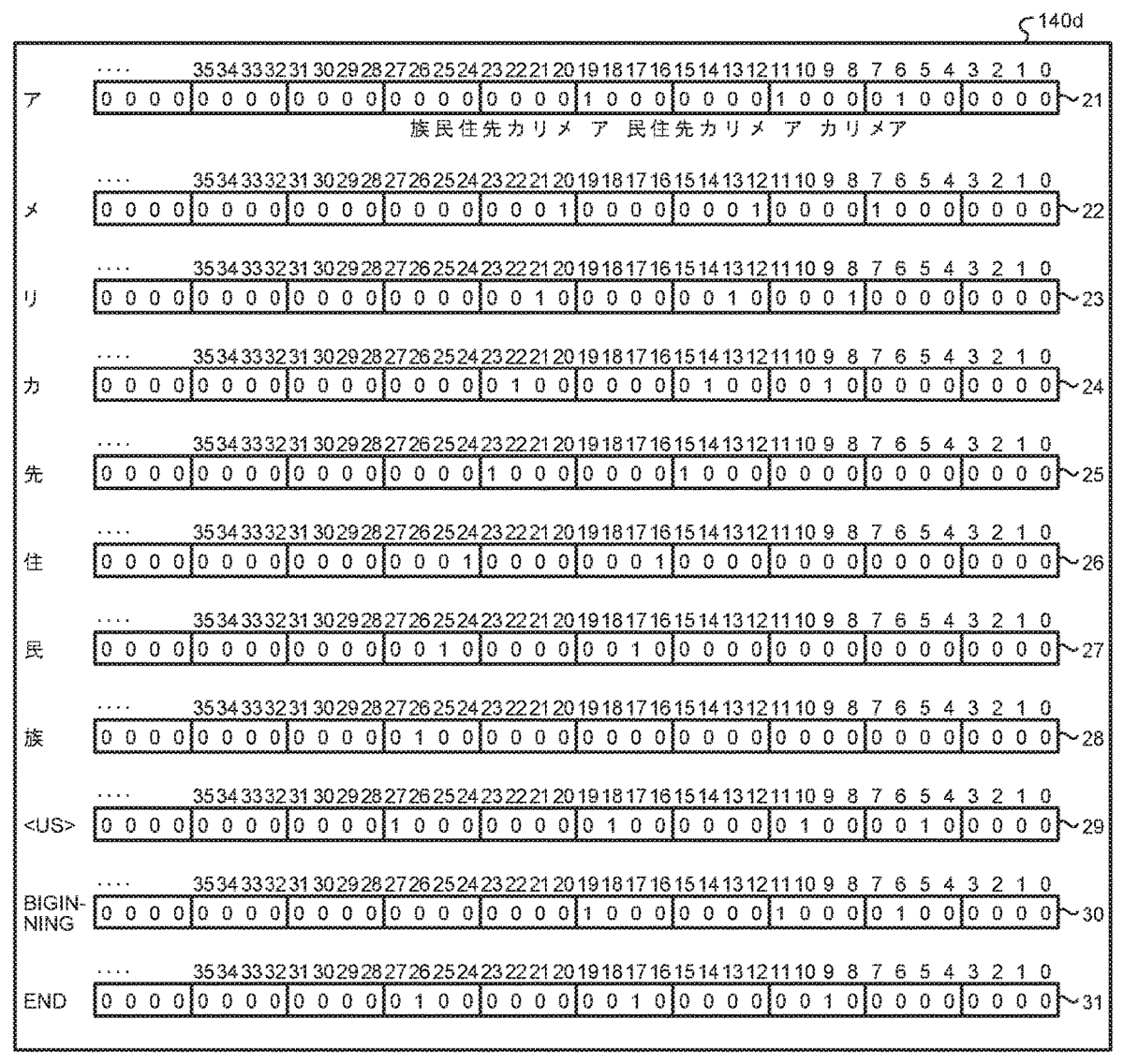

FIG. 6 is a diagram illustrating an example data structure of the index. As illustrated in FIG. 6, the index 140d includes bitmaps 21 to 31 corresponding to CJK characters, <US>, the beginning, and the end. For example, the bitmaps 21 to 28 correspond to the CJK characters "ア", "メ", "リ", "カ", "先", "住", "民", and "族", respectively. FIG. 6 eliminates the bitmaps corresponding to other CJK characters.

A bitmap 29 corresponds to <US>. A bitmap 30 corresponds to the "beginning" of the characters. A bitmap 31 corresponds to the "end" of the characters.

In the array data 140c illustrated in FIG. 5, for example, a CJK character "ア" is positioned at offsets "6, 11, 19" of the array data 140c. The setting unit 150a sets flags "1" at the offsets "6, 11, 19" of the bitmap 21 in the index 140d illustrated in FIG. 6. Similarly, the setting unit 150a sets flags for other CJK characters and <US>.

In the array data 140c illustrated in FIG. 5, the beginning of each CJK word is positioned at the offsets "6, 11, 19" of the array data 140c. The setting unit 150a sets flags "1" at the offsets "6, 11, 19" of the bitmap 30 in the index 140d illustrated in FIG. 6.

In the array data 140c illustrated in FIG. 5, the end of each CJK word is positioned at the offsets "9, 17, 26" of the array data 140c. The setting unit 150a sets flags "1" at the offsets "9, 17, 26" of the bitmap 31 in the index 140d illustrated in FIG. 6.

After generating the index 140d, the setting unit 150a generates the index data 145 by hashing the index 140d in order to reduce the amount of data of the index 140d.

Figure 7:
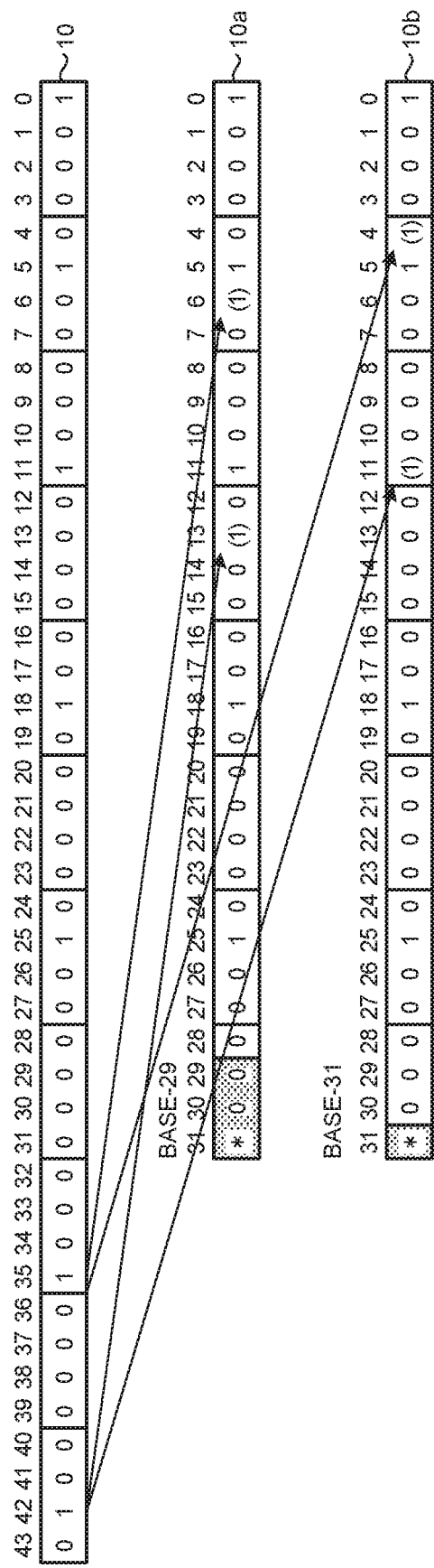
FIG. 7 is a diagram for describing hashing of the index.

FIG. 7 is a diagram for describing hashing of the index. The following describes the procedure of hashing on a bitmap 10 included in, for example, the index.

For example, the setting unit 150a generates a base-29 bitmap 10a and a base-31 bitmap 10b from the bitmap 10. The bitmap 10a is generated such that the bitmap 10 is segmented at every 29 offsets, and flags "1" at offsets from the beginning of each segmented portion are represented by flags at the offsets 0 to 28 of the bitmap 10a.

The setting unit 150a copies the information on the offsets 0 to 28 of the bitmap 10 to the bitmap 10a. The setting unit 150a processes the information on the offsets 29 and later of the bitmap 10a in the following manner.

A flag "1" is set at the offset "35" of the bitmap 10. Since the offset "35" is the offset "28+7", the setting unit 150a sets "(1)" at the offset "6" of the bitmap 10a. Note that the initial offset is 0. A flag "1" is set at the offset "42" of the bitmap 10. Since the offset "42" is the offset "28+14", the setting unit 150a sets a flag "(1)" at the offset "13" of the bitmap 10a.

The bitmap 10b is generated such that the bitmap 10 is segmented at every 31 offsets, and flags "1" at offsets from the beginning of each segmented portion are represented by flags at offsets 0 to 30 of the bitmap 10b.

A flag "1" is set at the offset "35" of the bitmap 10. Since the offset "35" is the offset "30+5", the setting unit 150a sets "(1)" at the offset "4" of the bitmap 10b. Note that the initial offset is 0. A flag "1" is set at the offset "42" of the bitmap 10. Since the offset "42" is the offset "30+12", the setting unit 150a sets a flag "(1)" at the offset "11" of the bitmap 10b.

The setting unit 150a performs the processing above to generate the bitmaps 10a and 10b from the bitmap 10. These bitmaps 10a and 10b are the results of hashing the bitmap 10. The bitmap 10 has the length of 0 to 43 in this example, but if the bitmap 10 having the length of 43 or greater, the flags "1" in the bitmap 10 can be represented by those in the bitmap 10a and the bitmap 10b.

Figure 8:
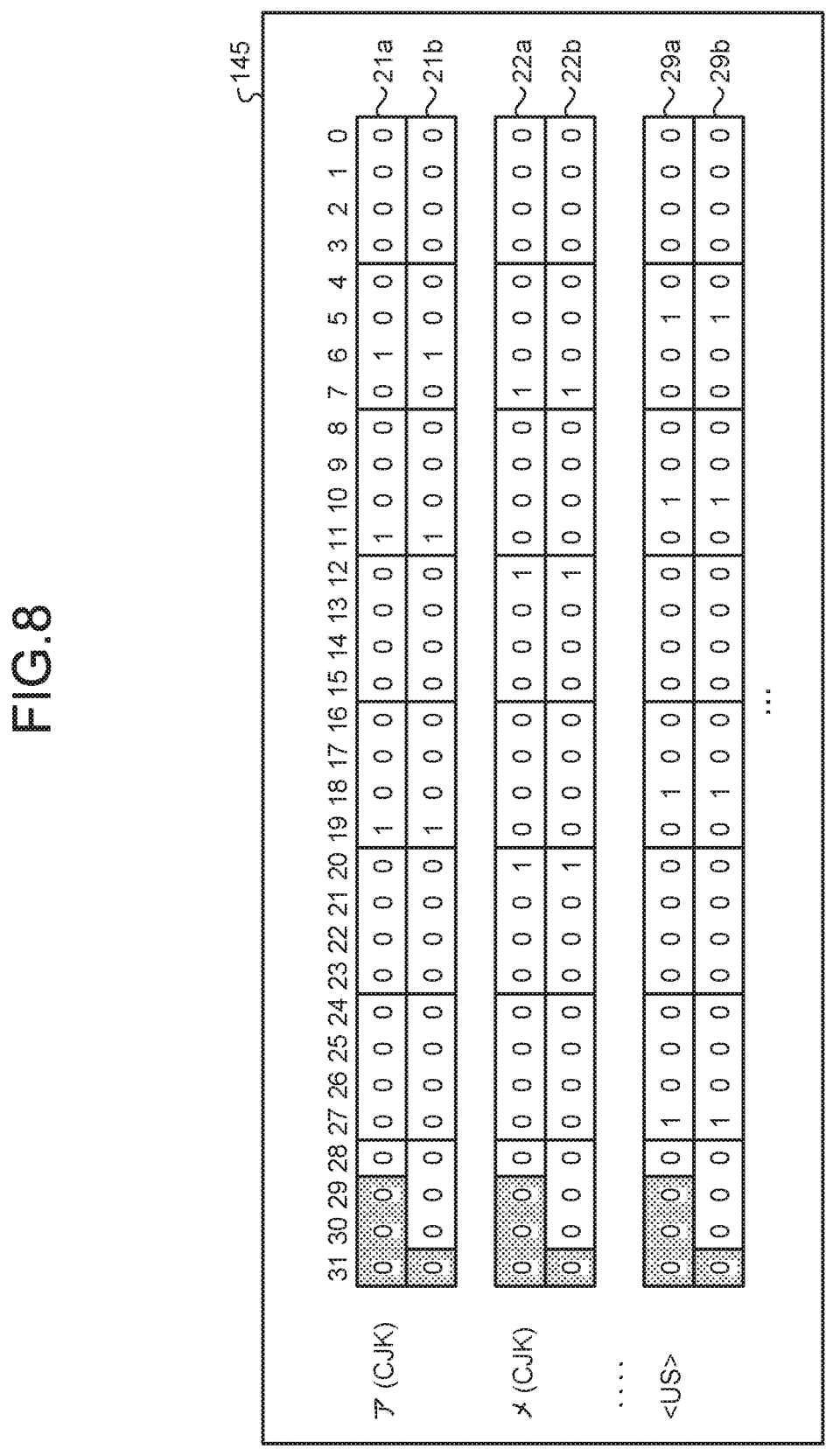

The setting unit 150a generates the index data 145 by hashing the bitmaps 21 to 31 illustrated in FIG. 6. FIG. 8 is a diagram illustrating an example data structure of the index data. For example, the setting unit 150a hashes the bitmap 21 in the index 140d illustrated in FIG. 6 to generate bitmaps 21a and 21b illustrated in FIG. 8. The setting unit 150a hashes the bitmap 22 in the index 140d illustrated in FIG. 6 to generate bitmaps 22a and 22b illustrated in FIG. 8. The setting unit 150a hashes the bitmap 29 in the index 140d illustrated in FIG. 6 to generate bitmaps 29a and 29b illustrated in FIG. 8. The other hashed bitmaps are eliminated from FIG. 8.

Referring back to FIG. 2, the extraction unit 150b generates the index 140d based on the index data 145 and extracts a plurality of dividable CJK words based on the index 140d.

Figure 9:
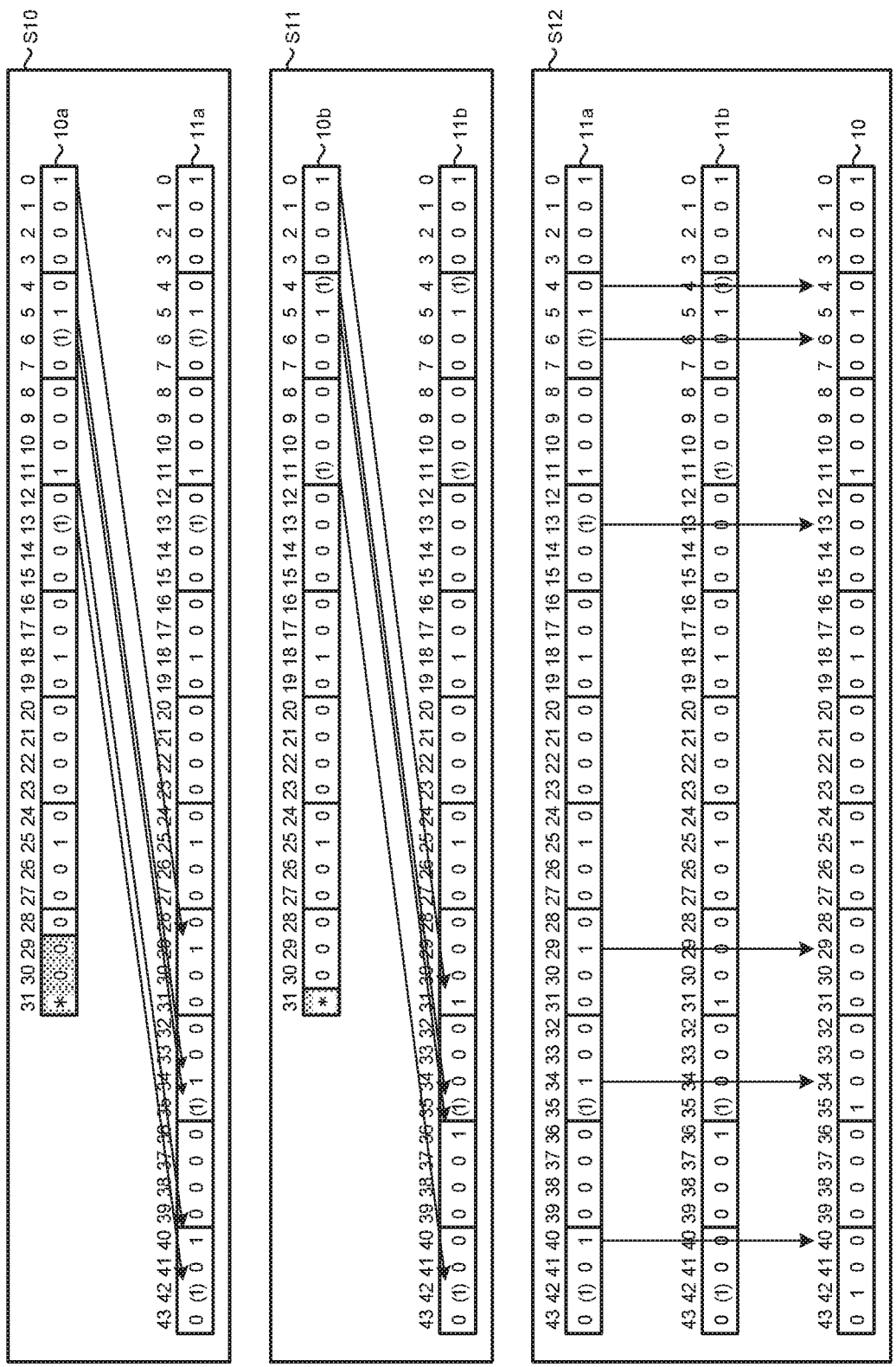
FIG. 9 is a diagram for describing an example process of restoring a hashed index.

The following describes example processing of the extraction unit 150b for generating the index 140d based on the index data 145. FIG. 9 is a diagram for describing an example process of restoring a hashed index. The following describes an example process of restoring the bitmap 10 based on the bitmap 10a and the bitmap 10b. The bitmaps 10, 10a, and 10b correspond to those described with reference to FIG. 7.

Processing at Step S10 is described. The extraction unit 150b generates the bitmap 11a based on the base-29 bitmap 10a. The information on flags set at the offsets 0 to 28 in the bitmap 11a is identical to the information on flags set at the offsets 0 to 28 in the bitmap 10a. The information on flags set at the offsets 29 and later in the bitmap 11a is the repetition of the information on flags set at the offsets 0 to 28 in the bitmap 10a.

Processing at Step S11 is described. The extraction unit 150b generates the bitmap 11b based on the base-31 bitmap 10b. The information on flags set at the offsets 0 to 30 in the bitmap 11b is identical to the information on flags set at the offsets 0 to 30 in the bitmap 10b. The information on flags set at the offsets 31 and later in the bitmap 11b is the repetition of the information on flags set at the offsets 0 to 30 in the bitmap 10b.

Processing at Step S12 is described. The extraction unit 150b performs the logical AND operation between the bitmap 11a and the bitmap 11b and generates the bitmap 10. In the example illustrated in FIG. 9, flags "1" are set at the offsets "0, 5, 11, 18, 25, 35, 42" in the bitmap 11a and the bitmap 11b. Accordingly, flags "1" are set at the offsets "0, 5, 11, 18, 25, 35, 42" in the bitmap 10. This bitmap 10 is a restored bitmap. The extraction unit 150b repeatedly performs the same processing on the other bitmaps to restore the bitmaps and generate the index 140d.

Figure 11:
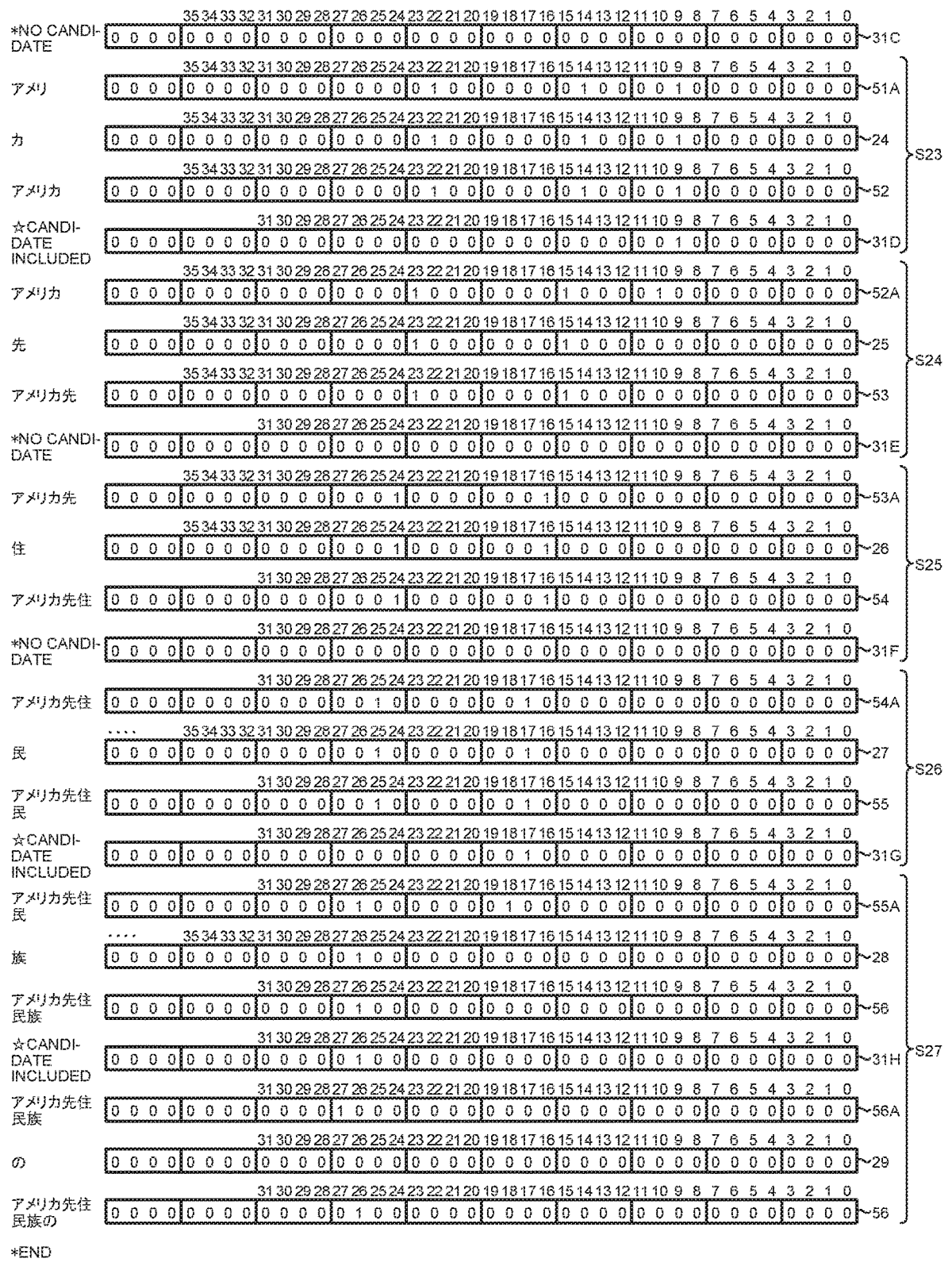

After generating the index 140d, the extraction unit 150b extracts dividable CJK words based on the index 140d. FIGS. 10 and 11 are diagrams for describing an example process of extracting the CJK words. The character string data 140a includes a phrase starting as "アメリカ先住民の…" in the example illustrated in FIGS. 10 and 11, and the extraction unit 150b reads, from the index 140d, bitmaps corresponding to the respective characters in the character string data 140a from the first character and performs the following processing.

Processing at Step S20 is described. The extraction unit 150b reads a bitmap 30 corresponding to the beginning, a bitmap 31 corresponding to the end, and a bitmap 21 corresponding to a character "ア" from the index 140d. The extraction unit 150b performs the logical AND operation between the bitmap 30 corresponding to the beginning and the bitmap 21 corresponding to the character "ア" to specify whether the character is at the beginning position. The result of the logical AND operation between the bitmap 30 corresponding to the beginning and the bitmap 21 corresponding to the character "ア" is output as a bitmap 30A. In the bitmap 30A, flags "1" are set at the offsets "6, 11, 19", and this indicates that the beginning of the CJK words is at the offsets "6, 11, 19".

The extraction unit 150b performs the logical AND operation between the bitmap 31 corresponding to the end and the bitmap 21 corresponding to the character "ア" to specify whether the character is at the end position. The result of the logical AND operation between the bitmap 31 corresponding to the end and the bitmap 21 corresponding to the character "ア" is output as a bitmap 31A. The bitmap 31A includes no flag "1", which means that "ア" is not an end candidate.

Processing at Step S21 is described. The extraction unit 150b shifts the bitmap 21 corresponding to the character "ア" by one to the left to generate a bitmap 21A. The extraction unit 150b reads a bitmap 22 corresponding to a character "メ" from the index 140d. The extraction unit 150b performs the logical AND operation between the bitmap 21A and the bitmap 22 and generates a bitmap 50 corresponding to a character string "アメ".

The extraction unit 150b performs the logical AND operation between the bitmap 31 corresponding to the end and the bitmap 50 corresponding to the character string "アメ" to specify whether the characters are at the end position. The result of the logical AND operation between the bitmap 31 corresponding to the end and the bitmap 50 corresponding to the character string "アメ" is output as a bitmap 31B. The bitmap 31B includes no flag "1", which means that the character string "アメ" has no end candidate.

Processing at Step S22 is described. The extraction unit 150b shifts the bitmap 50 corresponding to the character string "アメ" by one to the left to generate a bitmap 50A. The extraction unit 150b reads a bitmap 23 corresponding to a character "リ" from the index 140d. The extraction unit 150b performs the logical AND operation between the bitmap 50A and the bitmap 23 and generates a bitmap 51 corresponding to a character string "アメリ".

The extraction unit 150b performs the logical AND operation between the bitmap 31 corresponding to the end and the bitmap 51 corresponding to the character string "アメリ" to specify whether the characters are at the end position. The result of the logical AND operation between the bitmap 31 corresponding to the end and the bitmap 51 corresponding to the character string "アメリ" is output as a bitmap 31C. The bitmap 31C includes no flag "1", which means that the character string "アメリ" has no end candidate.

Processing at Step S23 is described. The extraction unit 150b shifts the bitmap 51 corresponding to the character string "アメリ" by one to the left to generate a bitmap 51A. The extraction unit 150b reads a bitmap 24 corresponding to a character "カ" from the index 140d. The extraction unit 150b performs the logical AND operation between the bitmap 51A and the bitmap 24 and generates a bitmap 52 corresponding to a character string "アメリカ".

The extraction unit 150b performs the logical AND operation between the bitmap 31 corresponding to the end and the bitmap 52 corresponding to the character string "アメリカ" to specify whether the characters are at the end position. The result of the logical AND operation between the bitmap 31 corresponding to the end and the bitmap 52 corresponding to the character string "アメリカ" is output as a bitmap 31D. The bitmap 31D includes a flag "1", which means that the character string "アメリカ" has an end candidate "カ". The extraction unit 150b extracts the character string "アメリカ" from the beginning character "ア" specified at Step S20 to the end character "カ" specified at Step S23 as a dividable CJK word candidate.

Processing at Step S24 is described. The extraction unit 150b shifts the bitmap 52 corresponding to the character string "アメリカ" by one to the left to generate a bitmap 52A. The extraction unit 150b reads a bitmap 25 corresponding to a character "先" from the index 140d. The extraction unit 150b performs the logical AND operation between the bitmap 52A and the bitmap 25 and generates a bitmap 53 corresponding to a character string "アメリカ先".

The extraction unit 150b performs the logical AND operation between the bitmap 31 corresponding to the end and the bitmap 53 corresponding to the character string "アメリカ先" to specify whether the characters are at the end position. The result of the logical AND operation between the bitmap 31 corresponding to the end and the bitmap 53 corresponding to the character string "アメリカ先" is output as a bitmap 31E. The bitmap 31E includes no flag "1", which means that the character string "アメリカ先" has no end candidate.

Processing at Step S25 is described. The extraction unit 150b shifts the bitmap 53 corresponding to the character string "アメリカ先" by one to the left to generate a bitmap 53A. The extraction unit 150b reads a bitmap 26 corresponding to a character "住" from the index 140d. The extraction unit 150b performs the logical AND operation between the bitmap 53A and the bitmap 26 and generates a bitmap 54 corresponding to a character string "アメリカ先住".

The extraction unit 150b performs the logical AND operation between the bitmap 31 corresponding to the end and the bitmap 54 corresponding to the character string "アメリカ先住" to specify whether the characters are at the end position. The result of the logical AND operation between the bitmap 31 corresponding to the end and the bitmap 54 corresponding to the character string "アメリカ先住" is output as a bitmap 31F. The bitmap 31F includes no flag "1", which means that the character string "アメリカ先住" has no end candidate.

Processing at Step S26 is described. The extraction unit 150b shifts the bitmap 54 corresponding to the character string "アメリカ先住" by one to the left to generate a bitmap 54A. The extraction unit 150b reads a bitmap 27 corresponding to a character "民" from the index 140d. The extraction unit 150b performs the logical AND operation between the bitmap 54A and the bitmap 27 and generates a bitmap 55 corresponding to a character string "アメリカ先住民".

The extraction unit 150b performs the logical AND operation between the bitmap 31 corresponding to the end and the bitmap 55 corresponding to the character string "アメリカ先住民" to specify whether the characters are at the end position. The result of the logical AND operation between the bitmap 31 corresponding to the end and the bitmap 55 corresponding to the character string "アメリカ先住民" is output as a bitmap 31G. The bitmap 31G includes a flag "1", which means that the character string "アメリカ先住民" has an end candidate "民". The extraction unit 120b extracts the character string "アメリカ先住民" from the beginning character "ア" specified at Step S20 to the end character "民" specified at Step S26 as a dividable CJK word candidate.

Processing at Step S27 is described. The extraction unit 150b shifts the bitmap 55 corresponding to the character string "アメリカ先住民" by one to the left to generate a bitmap 55A. The extraction unit 150b reads a bitmap 28 corresponding to a character "族" from the index 140d. The extraction unit 150b performs the logical AND operation between the bitmap 55A and the bitmap 28 and generates a bitmap 56 corresponding to a character string "アメリカ先住民族".

The extraction unit 150b performs the logical AND operation between the bitmap 31 corresponding to the end and the bitmap 56 corresponding to the character string "アメリカ先住民族" to specify whether the characters are at the end position. The result of the logical AND operation between the bitmap 31 corresponding to the end and the bitmap 56 corresponding to the character string "アメリカ先住民族" is output as a bitmap 31H. The bitmap 31H includes a flag "1", which means that the character string "アメリカ先住民族" has an end candidate "族". The extraction unit 120b extracts the character string "アメリカ先住民族" from the beginning character "ア" specified at Step S20 to the end character "族" specified at Step S27 as a dividable CJK word candidate.

The extraction unit 150b shifts the bitmap 56 of the character string "アメリカ先住民族" by one to the left to generate a bitmap 56A. Since the index 140d includes no bitmap corresponding to a character string "の", the extraction unit 150b generates a bitmap 29 with all the flags being "0". In this case, the extraction unit 150b outputs the previous bitmap 56 as a bitmap corresponding to "アメリカ先住民族の".

The extraction unit 150b performs the processing from Step S20 to Step S27 and extracts dividable CJK words "アメリカ", "アメリカ先住民", and "アメリカ先住民族" included in the character string data 140a. The extraction unit 150b stores the information on the extracted CJK words in the storage unit 140 as the extraction result 140e.

Figure 12:
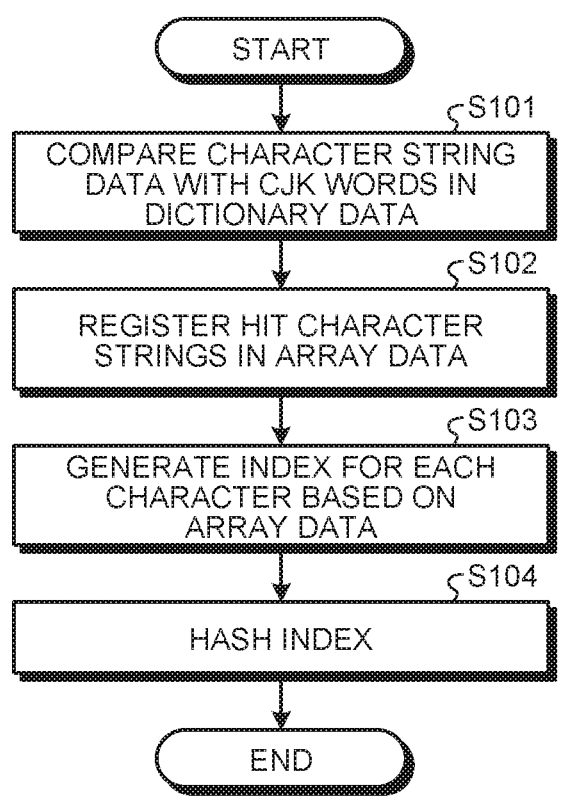
FIG. 12 is a flowchart illustrating the procedure of a setting unit of the analyzer.

Described next is an example procedure of the analyzer 100 according to the present embodiment. FIG. 12 is a flowchart illustrating the procedure of the setting unit of the analyzer. As illustrated in FIG. 12, the setting unit 150a of the analyzer 100 compares the character string data 140a with the CJK words in the dictionary data 140b (Step S101).

The setting unit 150a registers hit character strings (CJK words) in the array data 140c (Step S102). The setting unit 150a generates the index 140d of the characters (CJK characters) based on the array data 140c (Step S103). The setting unit 150a hashes the index 140d and generates the index data 145 (Step S104).

Figure 13:
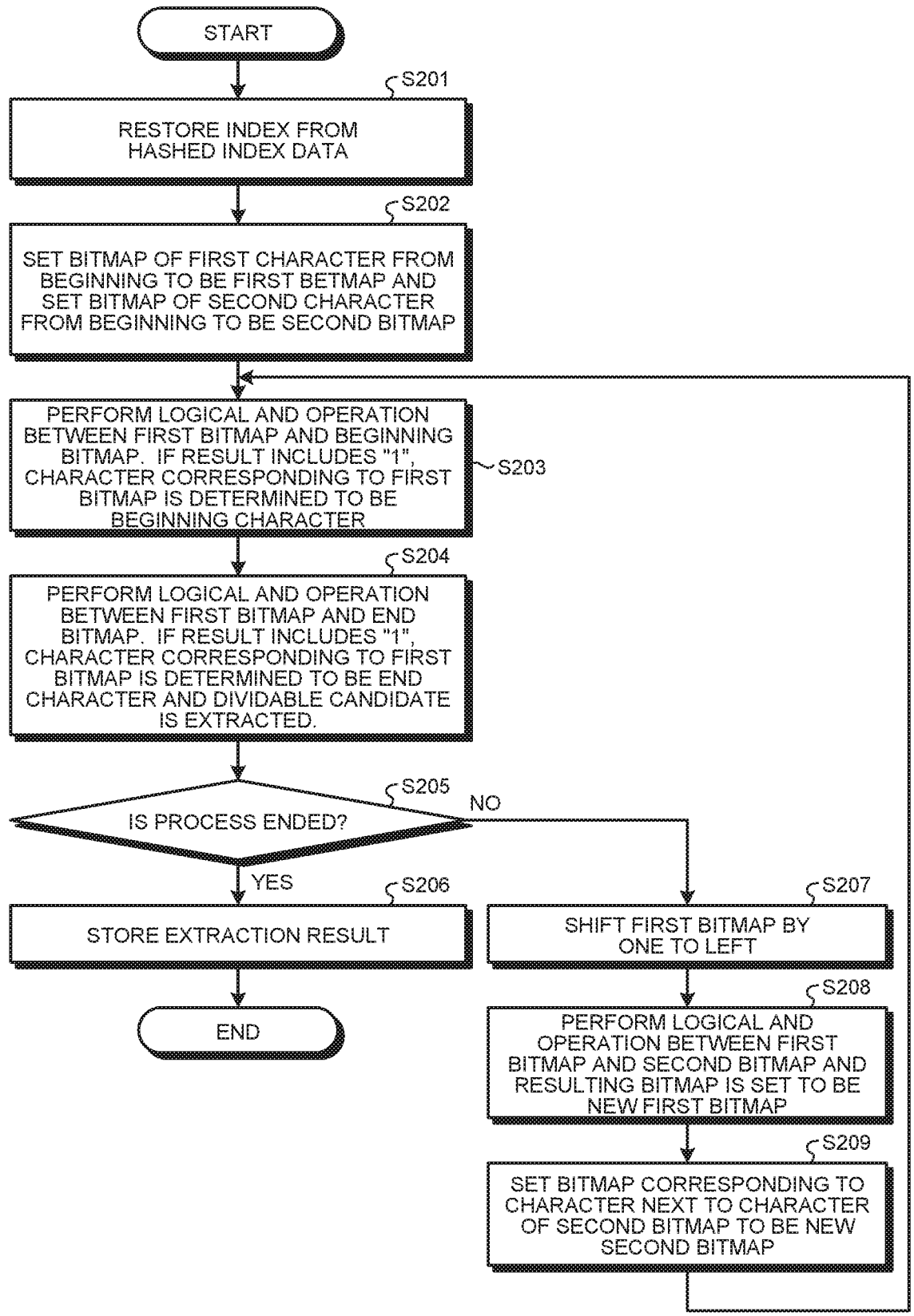
FIG. 13 is a flowchart illustrating the procedure of an extraction unit of the analyzer.

FIG. 13 is a flowchart illustrating the procedure of the extraction unit of the analyzer. As illustrated in FIG. 13, the extraction unit 150b of the analyzer 100 restores the index 140d from the hashed index data 145 (Step S201).

The extraction unit 150b sets a bitmap corresponding to the first character from the beginning of the character string data 140a to be a first bitmap and sets a bitmap corresponding to the second character from the beginning to be a second bitmap (Step S202).

The extraction unit 150b performs the logical AND operation between the first bitmap and the bitmap corresponding to the beginning. If the result of the operation includes "1", the extraction unit 150b determines that the character corresponding to the first bitmap is the beginning character (Step S203).

The extraction unit 150b performs the logical AND operation between the first bitmap and the bitmap corresponding to the end. If the result of the operation includes "1", the extraction unit 150b determines that the character corresponding to the first bitmap is the end character and extracts a dividable word candidate (Step S204).

If the process reaches the end of the character string data 140a (Yes at Step S205), the extraction unit 150b stores the extraction result 140e in the storage unit 140 (Step S206). If the process has not reached the end of the character string data 140a (No at Step S205), the extraction unit 150b proceeds to Step S207.

The extraction unit 150b shifts the first bitmap by one to the left (Step S207). The extraction unit 150b performs the logical AND operation between the first bitmap and the second bitmap and sets a resulting bitmap to be a new first bitmap (Step S208).

The extraction unit 150b sets a bitmap corresponding to a character next to the character of the second bitmap to be a new second bitmap (Step S209), and the process returns to Step S203.

Described next are the effects of the analyzer 100 according to the present embodiment. The analyzer 100 generates the index 140d relating to words (morphemes) defined in the dictionary data 140b based on the character string data 140a and the dictionary data 140b and sets flags by which the beginning and the end of each word can be specified. The analyzer 100 then extracts a plurality of dividable words from the character string data 140a by using the index 140d. For example, the index 140d includes a chunk of dividable words defined in the dictionary data 140b. Each word can be specified by the beginning and the end flags. The analyzer 100 determines the longest matching character string with the character strings defined by the beginning and the end flags being segmentation units to extract the dividable CJK words. The analyzer 100 specifies the dividable CJK words by using the index 140d and this configuration allows the analyzer 100 to perform a high-speed analysis with a reduced file size.

The analyzer 100 performs the logical AND operation between a bitmap corresponding to a combination of characters included in the character string data 140a and the bitmaps corresponding to the beginning and the end. The analyzer 100 then determines the beginning position and the end position of a dividable CJK word. This configuration allows the analyzer 100 to determine the beginning and the end of dividable CJK words by using the index 140d and the logical AND operation, which can reduce calculation costs. The analyzer 100 hashes the index 140d and generates the index data 145 and stores the generated data in the storage unit 140. This configuration can reduce the amount of data stored in the storage unit 140.

Figure 14:
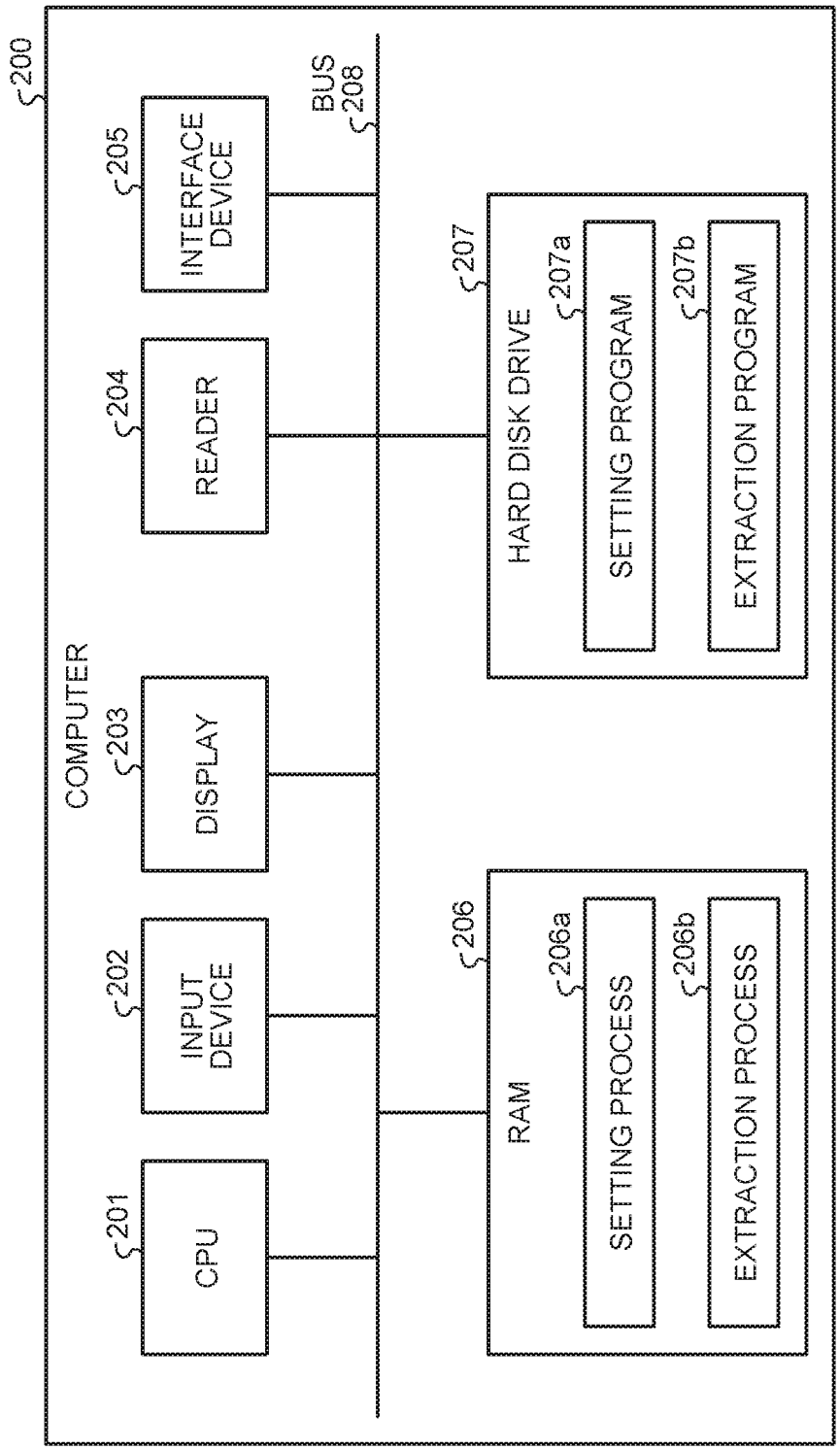
FIG. 14 is a diagram illustrating an example hardware configuration of a computer that implements the same functions as those of the analyzer.

Described next is an example hardware configuration of a computer that implements the same functions as those of the analyzer 100 described in the embodiment above. FIG. 14 is a diagram illustrating an example hardware configuration of a computer that implements the same functions as those of the analyzer.

As illustrated in FIG. 14, this computer 200 includes a CPU 201 that performs various types of calculation processing, an input device 202 that receives inputs of data from a user, and a display 203. The computer 200 includes a reader 204 that reads, for example, a computer program from a storage medium and an interface device 205 that transmits or receives data to or from other computers via a wired or wireless network. The computer 200 includes a random access memory (RAM) 206 serving as temporary storage for various kinds of information and a hard disk drive 207. The devices 201 to 207 are connected to a bus 208.

The hard disk drive 207 stores therein a setting program 207a and an extraction program 207b. The CPU 201 reads the setting program 207a and the extraction program 207b and loads them on the RAM 206.

The setting program 207a functions as a setting process 206a. The extraction program 207b functions as an extraction process 206b.

The setting process 206a corresponds to the processing of the setting unit 150a. The extraction process 206b corresponds to the processing of the extraction unit 150b.

The computer programs 207a and 207b are not necessarily stored in the hard disk drive 207 from the beginning. For example, the computer programs may be stored in a "portable physical medium" such as a flexible disk (FD), a compact disc read only memory (CD-ROM), a digital versatile disc (DVD), a magneto-optical disc, and an integrated circuit (IC) card to be inserted in the computer 200. The computer 200 may be configured to read and execute the computer programs 206a and 206b.

Using the index allows the analyzer to perform high-speed analysis with a reduced file size.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an analysis program that causes a computer to execute a process comprising:
generating an index based on a dictionary for use in morphological analysis, the index relating to morphemes registered in the dictionary, the index including flags by which a beginning and an end of each morpheme registered in the dictionary are determinable; and
extracting a plurality of dividable words from input character data by using the index, wherein
generating the index includes comparing the character data with the morphemes registered in the dictionary and generating array data in which morphemes included in the character data are arrayed with unit separators, each of the unit separators indicating a boundary between the morphemes.

2. The non-transitory computer-readable recording medium according to claim 1, wherein generating the index includes generating a bitmap including a flag indicating an offset of a character in the array data, so as to generate the index for each character.

3. The non-transitory computer-readable recording medium according to claim 2, further including setting, in the index, a bitmap corresponding to the beginning, the bitmap including a flag indicating an offset of a beginning character of the characters in the array data and a bitmap corresponding to the end, the bitmap including a flag indicating an offset of an end character of the characters in the array data.

4. The non-transitory computer-readable recording medium according to claim 3, wherein the extracting includes: performing a logical AND operation between a bitmap corresponding to a combination of characters included in the character data and the bitmaps corresponding to the beginning and the end to determine a beginning position and an end position of a dividable word; and extracting a plurality of dividable words based on a result of the determination.

5. An analysis method comprising:
generating an index based on a dictionary for use in morphological analysis, the index relating to morphemes registered in the dictionary, the index including flags by which a beginning and an end of each morpheme registered in the dictionary are determinable, by a processor; and
extracting a plurality of dividable words from input character data by using the index, wherein
generating the index includes comparing the character data with the morphemes registered in the dictionary and generating array data in which morphemes included in the character data are arrayed with unit separators, each of the unit separators indicating a boundary between the morphemes.

6. The analysis method according to claim 5, wherein the generating the index includes generating a bitmap including a flag indicating an offset of a character in the array data, so as to generate the bitmap for each character.

7. The analysis method according to claim 6, further including setting, in the index, a bitmap corresponding to the beginning, the bitmap including a flag indicating an offset of a beginning character in the characters in the array data and a bitmap corresponding to the end, the bitmap including a flag indicating an offset of an end character in the characters in the array data.

8. The analysis method according to claim 7, wherein the extracting includes: performing a logical AND operation between a bitmap corresponding to a combination of characters included in the character data and the bitmaps corresponding to the beginning and the end to determine a beginning position and an end position of a dividable word; and extracting a plurality of dividable words based on a result of the determination.

9. An analyzer comprising:
a memory; and
a processor coupled to the memory and configured to:
generate an index based on a dictionary for use in morphological analysis, the index relating to morphemes registered in the dictionary, the index including flags by which a beginning and an end of each morpheme registered in the dictionary are determinable, and
extract a plurality of dividable words from input character data by using the index, wherein
the processor is further configured to generate the index by comparing the character data with the morphemes registered in the dictionary and by generating array data in which morphemes included in the character data are arrayed with unit separators, each of the unit separators indicating a boundary between the morphemes.

10. The analyzer according to claim 9, wherein the processor is further configured to generate a bitmap including a flag indicating an offset of a character in the array data, so as to generate the bitmap for each character.

11. The analyzer according to claim 10, wherein the processor is further configured to set, in the index, a bitmap corresponding to the beginning, the bitmap including a flag indicating an offset of a beginning character of the characters in the array data and a bitmap corresponding to the end, the bitmap including a flag indicating an offset of an end character of the characters in the array data.

12. The analyzer according to claim 11, wherein the processor is further configured to:
perform a logical AND operation between a bitmap corresponding to a combination of characters included in the character data and the bitmaps corresponding to the beginning and the end to determine a beginning position and an end position of a dividable word, and
extract a plurality of dividable words based on a result of the determination.

* * * * *